United States Patent
Chandhoke

(10) Patent No.: US 9,336,051 B2
(45) Date of Patent: May 10, 2016

(54) PROGRAMMABLE CONTROLLER WITH MULTIPLE PROCESSORS USING A SCANNING ARCHITECTURE

(75) Inventor: Sundeep Chandhoke, Austin, TX (US)

(73) Assignee: National Instruments Corporation, Austin, TX (US)

( * ) Notice: Subject to any disclaimer, the term of this patent is extended or adjusted under 35 U.S.C. 154(b) by 2289 days.

(21) Appl. No.: 11/875,043

(22) Filed: Oct. 19, 2007

(65) Prior Publication Data

US 2009/0106761 A1    Apr. 23, 2009

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | |
|---|---|---|---|
| 4,566,061 A | 1/1986 | Ogden et al. | |
| 4,908,746 A | 3/1990 | Vaughn | |
| 5,068,778 A * | 11/1991 | Kosem et al. | 700/9 |
| 5,127,090 A | 6/1992 | Ruehle et al. | |
| 5,230,061 A | 7/1993 | Welch | |
| 5,247,682 A | 9/1993 | Kondou et al. | |
| 5,297,257 A * | 3/1994 | Struger et al. | 700/83 |
| 5,392,252 A | 2/1995 | Rimpo et al. | |
| 5,442,306 A | 8/1995 | Woo | |
| 5,481,741 A | 1/1996 | McKaskle et al. | |
| 5,586,259 A | 12/1996 | Kabe | |
| 5,594,917 A | 1/1997 | Palermo et al. | |
| 5,765,000 A | 6/1998 | Mitchell et al. | |
| 5,919,250 A | 7/1999 | Shimokawa | |
| 5,941,305 A | 8/1999 | Thrasher et al. | |
| 5,963,726 A | 10/1999 | Rust et al. | |
| 5,978,593 A | 11/1999 | Sexton | |
| 6,138,174 A | 10/2000 | Keeley | |
| 6,438,737 B1 * | 8/2002 | Morelli et al. | 326/38 |
| 6,526,462 B1 | 2/2003 | Elabd | |
| 6,629,165 B1 | 9/2003 | Seki et al. | |
| 6,631,301 B2 | 10/2003 | Focke | |

(Continued)

FOREIGN PATENT DOCUMENTS

WO    2004/077182    9/2004

OTHER PUBLICATIONS

A Combined PLC and CPU Approach to Multiprocessor Control (IEEE by J.J. Harris, J.D. Broesch, R.M. Coon 1995).*

(Continued)

*Primary Examiner* — Dong Kim
(74) *Attorney, Agent, or Firm* — Meyertons Hood Kivlin Kowert & Goetzel, P.C.; Jeffrey C. Hood

(57) ABSTRACT

Operating a programmable controller with a plurality of processors. The programmable controller may utilize a first subset of the plurality of processors for a scanning architecture. The first subset of the plurality of processors may be further subdivided for execution of periodic programs or asynchronous programs. The programmable controller may utilize a second subset of the plurality of processors for a data acquisition architecture. Execution of the different architectures may occur independently and may not introduce significant jitter (e.g., for the scanning architecture) or data loss/response time lag (e.g., for the data acquisition architecture). However, the programmable controller may operate according to any combination of the divisions and/or architectures described herein.

12 Claims, 10 Drawing Sheets

(56) References Cited

U.S. PATENT DOCUMENTS

| | | | |
|---|---|---|---|
| 6,658,564 B1 | 12/2003 | Smith et al. | |
| 6,779,048 B2 | 8/2004 | Seki et al. | |
| 6,853,867 B1 | 2/2005 | Klindt et al. | |
| 6,880,029 B2 * | 4/2005 | Tomita | 710/260 |
| 7,003,733 B2 | 2/2006 | Duemler | |
| 7,058,693 B1 | 6/2006 | Baker, Jr. | |
| 7,062,335 B2 | 6/2006 | Klindt et al. | |
| 7,103,424 B2 | 9/2006 | Chandhoke | |
| 7,231,531 B2 | 6/2007 | Cupps et al. | |
| 7,257,679 B2 | 8/2007 | Clark | |
| 7,299,099 B1 * | 11/2007 | Divelbiss et al. | 700/18 |
| 7,516,265 B2 * | 4/2009 | Martin et al. | 711/100 |
| 7,873,430 B1 * | 1/2011 | Sprecher | 700/100 |
| 2002/0133240 A1 | 9/2002 | Nagao et al. | |
| 2007/0162157 A1 | 7/2007 | Chandhoke | |
| 2007/0162906 A1 | 7/2007 | Chandhoke | |
| 2007/0173959 A1 | 7/2007 | Chandhoke | |

OTHER PUBLICATIONS

Programmable logic controllers: the complete guide to the technology by Clarence T. Jones 1996 ISBN 1889101001.*

"Simatic FM 352-5 High-speed Boolean Processor User Manual"; Edition Apr. 2003; 246 pages; SIEMENS Energy & Automation Inc.: Alpharetta GA.

"Programmable logic controller", Wikipedia, http://en.wikipedia.org/wiki/Programmable_logic_controller, retrieved from Internet Mar. 2, 2007, 9 pages.

"Field-programmable gate array", Wikipedia, http://en.wikipedia.org/wiki/FPGA, retrieved from Internet Mar. 2, 2007, 10 pages.

* cited by examiner

PROGRAMMABLE CONTROLLER WITH MULTIPLE PROCESSORS USING A SCANNING ARCHITECTURE

FIELD OF THE INVENTION

The present invention relates to the field of programmable controllers, and more particularly to a programmable controller with multiple processors.

DESCRIPTION OF THE RELATED ART

In recent years, programmable controllers such as programmable logic controllers (PLCs) and programmable automation controllers (PACs), have become central for controlling relays, motion, distributed resources, networking, and automation, among others. Programmable controllers have become so ubiquitous because of their ability to provide a "generic" solution to a variety of control, measurement, and automation problems. However, programmable controllers currently do not implement multiple processors (e.g., multiple processing chips or cores) and do not provide for management of multiple processors in a programmable controller. Thus, improved systems and methods for multiple processor programmable controllers are desirable.

SUMMARY OF THE INVENTION

Various embodiments of the present invention include a system and method for utilizing multiple processors in programmable controllers.

More specifically, the present invention may be directed towards a programmable controller which may include a plurality of channels for receiving input and a plurality of processors. The programmable controller may control a plurality of devices coupled to the programmable controller (e.g., via the plurality of channels). The programmable controller is operable to receive input and/or asynchronous events from one or more of the plurality of devices. The plurality of processors may include a first one or more processors and a second one or more processors.

Additionally, the programmable controller may include at least one memory medium coupled to the plurality of processors and the plurality of channels. The memory medium may store an I/O scanning engine that is executable by at least one of the first one or more processors. The I/O scanning engine may be executable to receive input from the plurality of channels of the programmable controller according to a scanning architecture. The memory medium may also store a plurality of user programs. The plurality of user programs may be each executable to perform a task based on input received from the plurality of channels. The plurality of user programs may be executable to receive input from the plurality of devices.

The memory medium may also store a scheduler program that may be executable by at least one of the processors. The scheduler program may be executable to allocate each of the plurality of user programs to respective ones of the plurality of processors. For example, the scheduler program may be operable to schedule at least two user programs to execute on respective processors concurrently. The scheduler program may be operable to schedule a first subset of the plurality of user programs to execute on the first one or more processors according to the scanning architecture, and the scheduler program may be operable to schedule a second subset of the plurality of user programs to execute on the second one or more processors in response to asynchronous events. Note that the scheduler program (or some other analysis program beforehand) may be operable to assign priorities to the plurality of user programs (e.g., the first subset of the plurality of programs) possibly by analyzing data dependencies of the plurality of programs. For example, if two user programs do not have data dependencies on one another, they may be executed in any order or concurrently, while one with data dependencies may need to be executed in a certain order. Alternatively, or additionally, the user may assign some or all of the priorities of the user programs. The scheduler program may then schedule the plurality of programs (e.g., the first subset of the plurality of programs) according to that priority.

Scheduling execution (or execution itself) of the second subset of the plurality of user programs on the second one or more processors may not introduce a delay in execution of the first subset of the plurality of user programs executing on the first one or more processors.

Note that the scheduler program may also handle assignment of the I/O scanning engine. For example, the scheduler program may be executable to assign portions of the I/O scanning engine to execute concurrently on at least two of the plurality of processors. In one embodiment, each portion of the I/O scanning engine may be operable to scan a respective bus or interface of the programmable controller.

BRIEF DESCRIPTION OF THE DRAWINGS

A better understanding of the present invention can be obtained when the following detailed description of the preferred embodiment is considered in conjunction with the following drawings, in which.

Figure 1A:
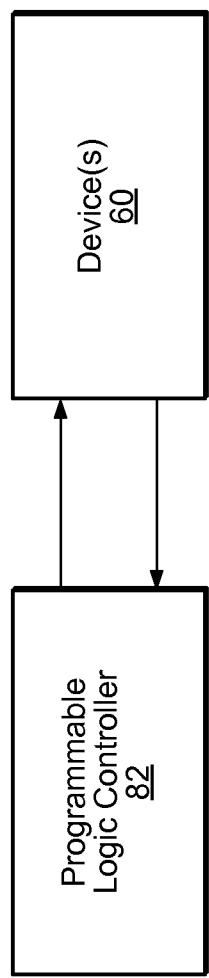
FIG. 1A illustrates a programmable logic controller coupled to one or more devices, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. application Ser. No. 11/338,922, titled "System and Method for Automatically Updating the Memory Map of a Programmable Logic Controller to Customized Hardware", filed Jan. 24, 2006.

U.S. application Ser. No. 11/427,052, titled "System and Method for Automatically Updating the Memory Map of a Programmable Controller to Customized Hardware," filed Jun. 28, 2006.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program. For example, a medium that is "configured to perform a function or implement a software object" may be 1) a memory medium or carrier medium that stores program instructions, such that the program instructions are executable by a processor to perform the function or implement the software object; 2) a medium carrying signals that are involved with performing the function or implementing the software object; and/or 3) a programmable hardware element configured with a hardware configuration program to perform the function or implement the software object.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may include two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE 7from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram includes interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may include only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may include a single window having one or more GUI Elements, or may include a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may include GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements include input controls and output indicators Input Control—a graphical user interface element for providing user input to a program. Exemplary input controls include dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Programmable Controller—programmable controllers may include programmable logic controllers (PLCs), programmable automation controllers (PACs), distributed control systems (DCSs), and/or other programmable controllers which utilize scanning architectures.

Task—A task may be included in a programmable controller and may itself include programs and variables, e.g., variables used by the programs. A task may define the schedule and/or manner in which the programs may be executed on the programmable controller, and may include a memory table that is updated before the execution of programs included in the task. For execution, the programs in the task may be assigned an execution order within the task, i.e., the order defines priority of program execution. Additionally, in a multitasking environment, each task may be assigned a specified priority with respect to the other tasks.

Programmable Controllers

The following descriptions describe embodiments of systems which utilize PLCs, PACs, and/or DCSs. Note that embodiments herein described with respect to PLCs may equally apply to embodiments with PACs and/or DCSs. In particular the embodiments may apply to those programmable controllers which implement scanning architectures, such as, for example, those described below. Note however, that the programmable controllers are not limited to those described herein, and that other programmable controllers are envisioned.

The term "programmable automation controller" is intended to capture the full breadth of its ordinary meaning and at least includes the characteristics described herein. In general, PACs combine the features of normal PLCs, such as those described above, with the capabilities of computer system control systems, e.g., using a personal computer. In some cases, PACs may provide a more open, modular programming environment than provided by normal PLCs. Additionally, such PACs may provide the protection and stability provided by PLCs that personal computing systems generally lack. For example, the PACs may include a ruggedized housing for protection from the local environment which can sometimes be quite corrosive. Additionally, the PACs may be generally more stable than personal computing systems simply due to the nature of current standard personal computing operating systems. Thus, in some embodiments, at least one PAC, e.g., using the scanning architecture described herein (e.g., in FIG. 3), may be used in conjunction with the architectures, systems, and methods described above.

Additionally, the term "distributed control system" is also intended to capture the full breadth of its ordinary meaning and at least includes the characteristics described herein. In general, DCSs include one or more instruments or computing systems for implementing various processes, such as those described above in relation to the use of PLCs. Thus, similar to the above descriptions regarding PACs, one or more DCSs may be used in conjunction with the systems and methods described herein.

FIG. 1A—Programmable Logic Controller System

FIG. 1A illustrates a programmable logic controller (PLC) 82 suitable for implementing various embodiments of the present invention. The term "PLC" or "programmable logic controller" is intended to have the full breadth of its ordinary meaning, and at least includes the characteristics described herein.

The PLC 82, may include one or more processors as well as a memory medium(s) coupled to the processor on which one or more computer programs or software components may be stored. More specifically, the PLC 82 may include a plurality of processors, which execute and may be scheduled according to embodiments presented below. As used herein "processors" may include processor cores or processing chips. For example, a programmable controller with multiple processors may include a single processing chip with multiple cores (e.g., 2, 4, 8, etc.) or may include multiple processing chips (e.g., multiple central processing units), where each processing chip includes one or more processors. Multiple processors may refer to any combination of chips and cores. For example, a PLC with multiple processors may include two processing chips and one or both of the processing chips may include multiple cores. In this example, the term "processor" may refer to each of the processing cores of both of the processing chips, but may also refer to each of the processing chips themselves. In one embodiment, where the PLC includes two processing chips, and one has two cores, the term processors may refer to the two cores and the processing chip with a single core. In other words, in this example, the term processor may refer to any entity which is able to independently process information.

The memory medium may store one or more programs which are executable to perform the methods described herein. In some embodiments, the programs may include graphical programs. Various embodiments further include receiving or storing instructions and/or data implemented in accordance with the foregoing description upon a carrier medium.

As shown in FIG. 1A, the PLC 82 may be coupled to one or more devices, e.g., device(s) 60. In some embodiments, the devices may be coupled directly to the PLC via an electrical interface. The devices may also be coupled to the PLC 82 via an intermediary device, e.g., another PLC 82, a programmable hardware element (PHE), or other suitable devices. In another embodiment, the devices may be implemented at a remote location and may be coupled to the PLC 82 via a network, e.g., LAN, WAN, Internet, Intranet, etc. In one embodiment, the PLC 82 may communicate directly with the one or more devices, or, alternatively, an intermediary device may provide a network communication interface between the PLC 82 and the remote devices. In various embodiments, the PLC 82 may communicate with the remote devices directly, or via an intermediary device, using any of a variety of communication protocols, e.g., TCP/IP, GPIB, Ethernet (e.g., CSMA/CD), Local Talk (e.g., CSMA/CA), Token Ring, FDDI, ATM, NetBEUI, IPX/SPX, IPv6, CANopen, DeviceNet, PROFInet, EtherNet/IP, EtherCAT, Ethernet Powerlink, SERCOS, or other suitable communication protocols.

In some embodiments, the PLC 82 may be coupled to a PHE, e.g., a field-programmable gate array (FPGA), which may provide a hardware interface between the PLC 82 and one or more coupled devices, e.g., device(s) 60. As indicated above, the devices may be local or remote to the PLC 82 and/or PHE, and may communicate with the PLC 82 via the PHE using any of various protocols. The devices may be of various types and may perform any of various tasks as will be described in more detail below.

In some embodiments, the PLC 82 may be included in or coupled to a chassis. In various embodiments, the chassis may include one or more module expansion slots operable to receive expansion modules. The expansion slots may be operable to receive any of a variety of expansion modules, including, PCI, PCI Express, ISA, PXI, VXI, GPIB, or other suitable form factors and/or card types. The expansion modules may be coupled to and may communicate with the PLC 82 via a backplane. For example, the backplane may include the programmable hardware element, e.g., the FPGA, which may operate to provide input and output to the PLC 82 from one or more devices included in or coupled to the chassis, e.g., the expansion modules plugged into the expansion slots or other devices coupled to the chassis. Additionally, in various embodiments, the backplane may implement any of a variety of buses, including, but not limited to, a VXI (VME eXtensions for Instrumentation) bus, a GPIB (General Purpose Interface Bus) bus, a PXI (PCI eXtensions for Instrumentation) bus, a CAN bus, a Profibus bus, a serial bus, a parallel bus, or other suitable buses. In some embodiments, where the backplane includes or is a PHE, a user may be able to program the PHE such that the backplane performs operations on the input and output from the PLC 82 and/or the devices coupled to the chassis. Examples of operations or functions that the PHE may perform will be described in more detail below.

In some embodiments, the PLC 82 may be coupled to a plurality of different programmable hardware elements, e.g., FPGAs, each communicating with the PLC 82 locally and/or remotely. One or more of the PHEs may be coupled to the PLC 82 or chassis via a networked connection and may provide I/O from devices or expansion modules coupled to the one or more remote PHEs. Similar to above, the PHEs may implement one or more of the above listed, or other, suitable protocols for network communication.

In one embodiment, the PLC 82 may be coupled to one or more PHEs, which may provide a hardware interface between the PLC 82 and one or more devices, and one or more other devices. The one or more other devices may be coupled to the PLC 82 directly and/or via an intermediary device.

In another embodiment, the PLC 82 may be coupled to a PHE which may be coupled to one or more devices and one or more other PHEs. In this embodiment, the PHE may provide a hardware interface between the one or more devices and the one or more other PHEs (each of which may provide a hardware interface for at least another device), and the PLC 82.

Figure 1B:
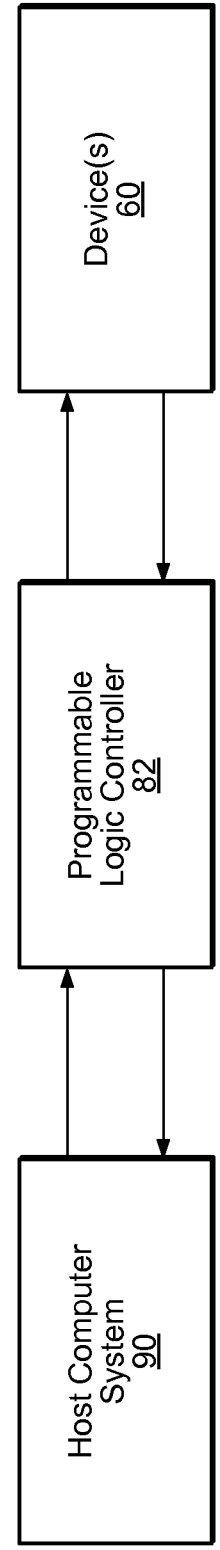
FIG. 1B illustrates a system comprising a programmable logic controller (PLC), one or more devices, and a host computer system that may implement one embodiment of the present invention.

FIG. 1B—Programmable Logic Controller Coupled to a Host Computer System

FIG. 1B illustrates a system including the programmable logic controller 82 coupled to the device(s) 60 as well as a host computer system 90. The PLC 82 may be coupled to the host computer system 90 via a network or a computer bus using any of various networks and protocols described above, among others. The computer system 90 may be any of various types, as desired. In some embodiments, a program executing on the computer system 90 may provide a human-machine interface (HMI) for the PLC 82. For example, the program may be an HMI application executing on the host computer, and facilitating user interaction with the PLC 82. In this embodiment, the program may receive input from a user on host computer system 90 with regard to instructions for the PLC 82, which may then provide input to the PLC 82 accordingly. In some embodiments, the instructions may also be directed toward, and subsequently provided to, the PHE providing the hardware interface between the device(s) and the PLC 82.

In one embodiment, a program, e.g., a graphical program, may be downloaded to and executed on the PLC 82, and/or one or more devices, e.g., one or more PHEs, coupled to the PLC 82. This program may act as controller engine(s) or scheduler(s) on the PLC 82. In some embodiments, the program may provide a runtime environment for tasks executing on the PLC 82. For example, an application development environment with which the program is associated (e.g., the LabVIEW graphical program development environment, provided by National Instruments Corporation) may provide support for downloading a program for execution on the PLC 82 in a real time system.

In some embodiments, the program, e.g., the graphical program, may execute in a distributed fashion. For example, at least one portion of the program, e.g., at least one portion of a block diagram of the program, may be implemented and/or executed on one or more PHEs coupled to the PLC 82 and another portion, e.g., another portion of the block diagram, may be implemented and/or executed on the PLC 82. In one embodiment, one portion, e.g., the program's GUI, of the program may be executed on the host computer system coupled to the PLC 82. More specifically, in one embodiment, a portion of the graphical program may execute on the PLC 82 (e.g., the PLC may be configured according to the portion of the graphical program) and another portion of the graphical program (e.g., including the front panel of the graphical program) may execute (e.g., concurrent to execution of the graphical program portion on the PLC 82) on the computer system 90, e.g., to provide an MMI for the graphical program portion executing on the PLC 82.

In further embodiments, the PLC 82 may be a "soft" PLC, i.e., a computer program running on a computer system such as host computer system 90 that mimics the operation of a standard PLC. The computer program may be a graphical program, such as a LabVIEW graphical program, and may operate to perform all the functionality of PLCs described herein.

Exemplary Systems

As indicated above, embodiments of the present invention may apply to programmable controllers with multiple processors. Embodiments of the present invention may be applicable in systems involved with performing test and/or measurement functions; controlling and/or modeling instrumentation or industrial automation hardware; modeling and simulation functions, e.g., modeling or simulating a device or product being developed or tested; vision systems, etc.

However, it is noted that embodiments of the present invention may be used for a plethora of applications and are not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as network control, network monitoring, financial systems, games, etc.

Figure 2A:
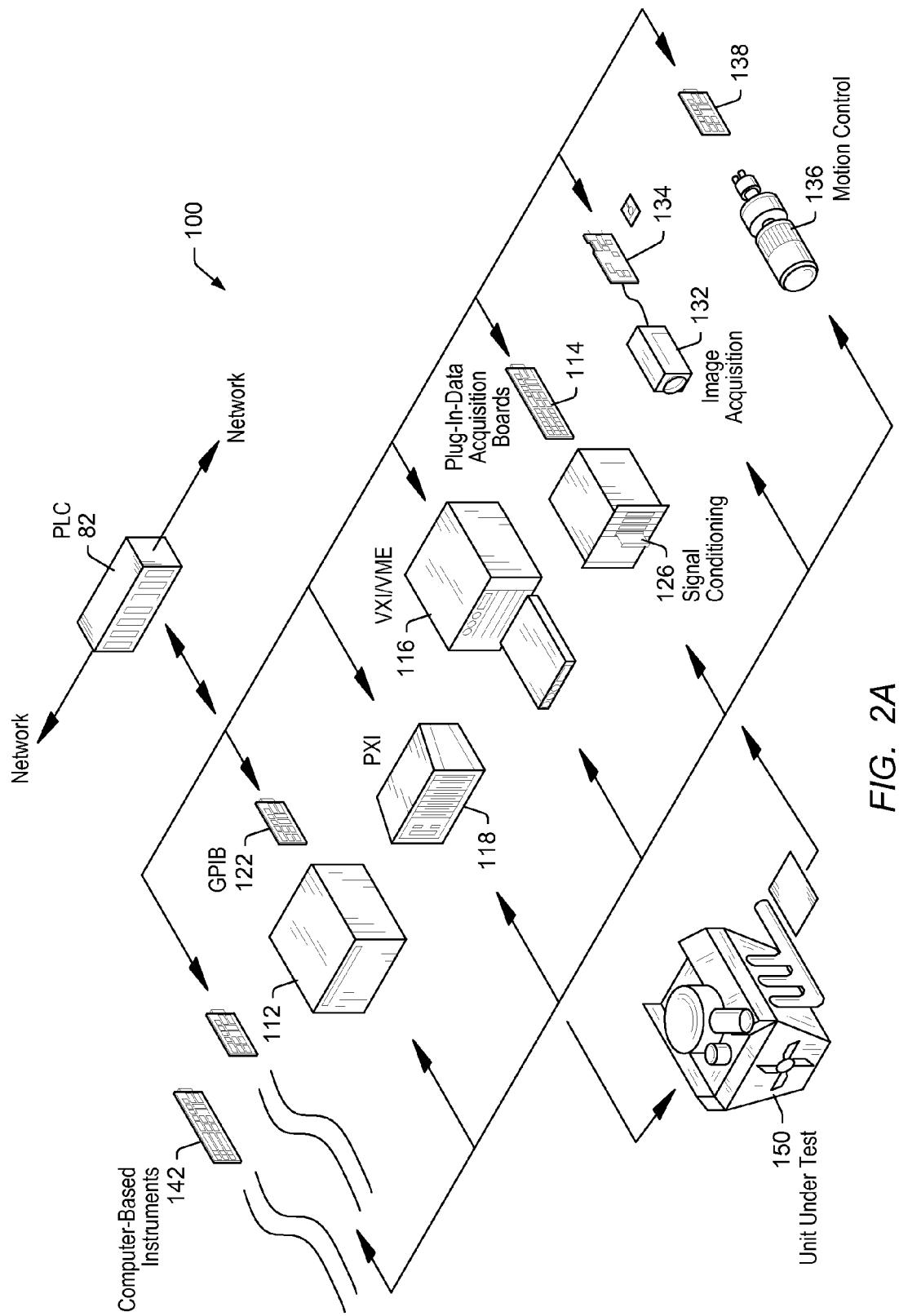
FIG. 2A illustrates an instrumentation control system, according to one embodiment.

FIG. 2A illustrates an exemplary instrumentation control system 100 which may implement embodiments of the invention. The system 100 includes programmable logic controller 82, which may couple to one or more instruments, e.g., via a PHE. As described above, the PLC 82 may include a processor and memory. The PLC 82 may operate with the one or more instruments to analyze, measure, or control the unit under test (UUT) or process 150.

The one or more instruments may include a GPIB instrument 112 and associated GPIB interface card 122, a data acquisition board 114 and associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The PLC may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
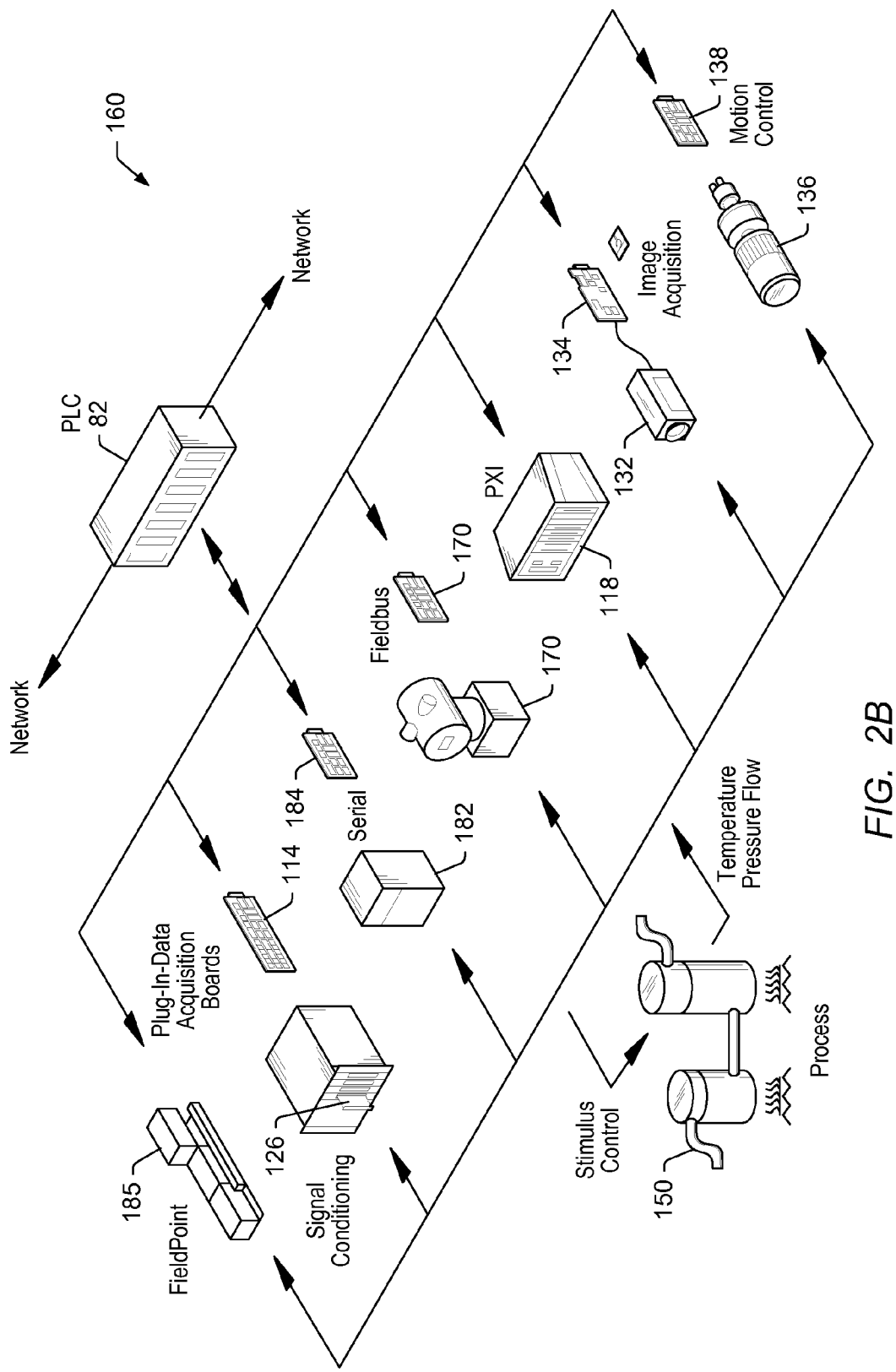
FIG. 2B illustrates an industrial automation system, according to one embodiment.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may include programmable logic controller 82 which couples to one or more devices or instruments. The PLC 82 may include a processor and memory. The PLC 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 126, a PXI instrument 118, a video device 132 and associated image acquisition card 134, a motion control device 136 and associated motion control interface card 138, a fieldbus device 170 and associated fieldbus interface card 172, a serial instrument 182 and associated serial interface card 184, or a distributed data acquisition system, such as the Fieldpoint system available from National Instruments, among other types of devices.

Figure 3:
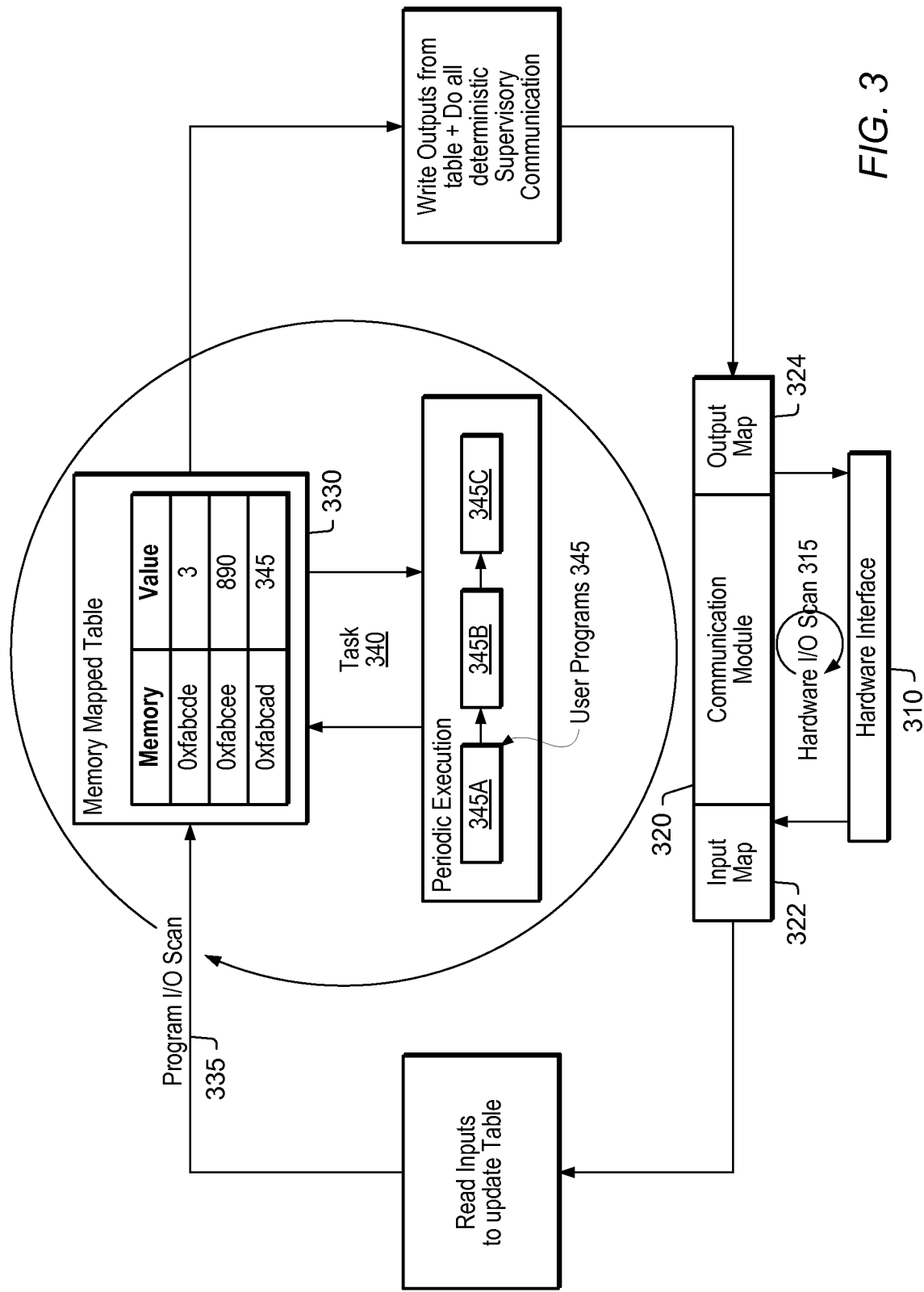
FIG. 3 is a block diagram illustrating an exemplary scanning architecture of a programmable logic controller, according to one embodiment.

FIG. 3—Functionality of an Exemplary Programmable Logic Controller

FIG. 3 is a block diagram illustrating the functionality of an exemplary programmable logic controller according to some embodiments of the present invention. More specifically, FIG. 3 illustrates the operation of a programmable logic controller utilizing an exemplary scanning architecture. As used herein, the term "scanning architecture" is used to refer to a periodic execution of programs used by typical programmable controllers. Scanning architectures are typically used for control based programming models, which rely on real time execution and minimal jitter. In these control based models, I/O is typically single point. Additionally, the control algorithms in such models may rely on the most recent data and may not require or rely on historical data (e.g., missed data may not be important).

Scanning architectures include an input/output (I/O) scan where an I/O scanning engine (or program) receives data from input channels (or memory buffers that have received data from coupled devices since the last I/O scan) and provides data on output channels (e.g., to coupled devices). The input channels may be located on the coupled devices themselves (e.g., when connected over a network) or on inputs/modules connected to the programmable controller (e.g., cards plugged into a PCIe bus of the programmable controller). As used herein, "channels" may refer to input or output channels (uni or bi directional, as desired) which provide input to or output from the programmable controller.

Scanning architectures also include a "program scan" where user tasks and/or programs are executed. These user programs typically use data received during the I/O scan (and/or execute in response to data received during the I/O scan) and may provide data to be transmitted during the next I/O scan. Typical scanning architectures execute periodically on a millisecond scale (among other scales, e.g., microseconds, seconds, etc.). Various embodiments of an exemplary programmable controller which operates according to a scanning architecture are described below.

As shown in FIG. 3, various elements may provide respective functionality of the PLC. For instance, as noted above, hardware interface 310, e.g., a PHE, may provide for communication between the PLC and coupled devices. Additionally, communication module 320 may include a memory map, i.e., an input map 322 and an output map 324, for receiving and storing information from and to the coupled devices (via the hardware interface 310) respectively. Note that the memory map may be included in or coupled to the PLC. Additionally, the PLC may include one or more tasks, e.g., task 340, that may execute during PLC operation. Each task may include one or more user programs, e.g., 345A, 345B, and 345C, that may access a memory mapped table 330 for reading and writing data, e.g., for communicating with hardware coupled to or comprised in the PLC. It should be noted that one or more of the user programs may be graphical programs or text-based programs.

During execution, the PLC may utilize a hardware input/output (I/O) scan 315 of the hardware interface 310 to update the input map 322 according to hardware output, and to provide input to the hardware via the output map 324 of the communication module 320. A program I/O scan 335 may read inputs from the input map 322 and write these inputs into memory mapped table 330. The program I/O scan 335 may also write outputs from the memory mapped table 330 into the output map 324. Thus, the memory map, i.e., the I/O maps, and memory mapped table may facilitate communications between the tasks (i.e., programs included in the tasks) and hardware coupled to or comprised in the PLC.

One or more tasks may be executing on the PLC, such as task 340. Each task may have an associated frequency of execution, i.e., the number of times the task is executed within a specified amount of time, or the length of time between executions, e.g., a task may execute every 10 ms, 100 ms, 504 ms, etc.

Additionally, as noted above, each task may include one or more programs, such as user programs 345, e.g., programs 345A, 345B, and 345C. Each program, as shown, may have a specific respective priority, e.g., the programs may have a specific order of execution each time the task executes. For example, in each task execution cycle, program 345A may execute first, followed by programs 345B and 345C. In some embodiments, the task may execute according to one or more timed loops whose operation may be specified by a program, e.g., a graphical program or a text-based program, included in the PLC, e.g., a timed loop scheduler. In some embodiments, the PLC may include a runtime environment, e.g., LabVIEW runtime, which specifies task execution. The runtime environment may include a controller engine for tasks executing in the PLC, and, in embodiments where timed loops are implemented, the timed loop scheduler.

Figure 4A:
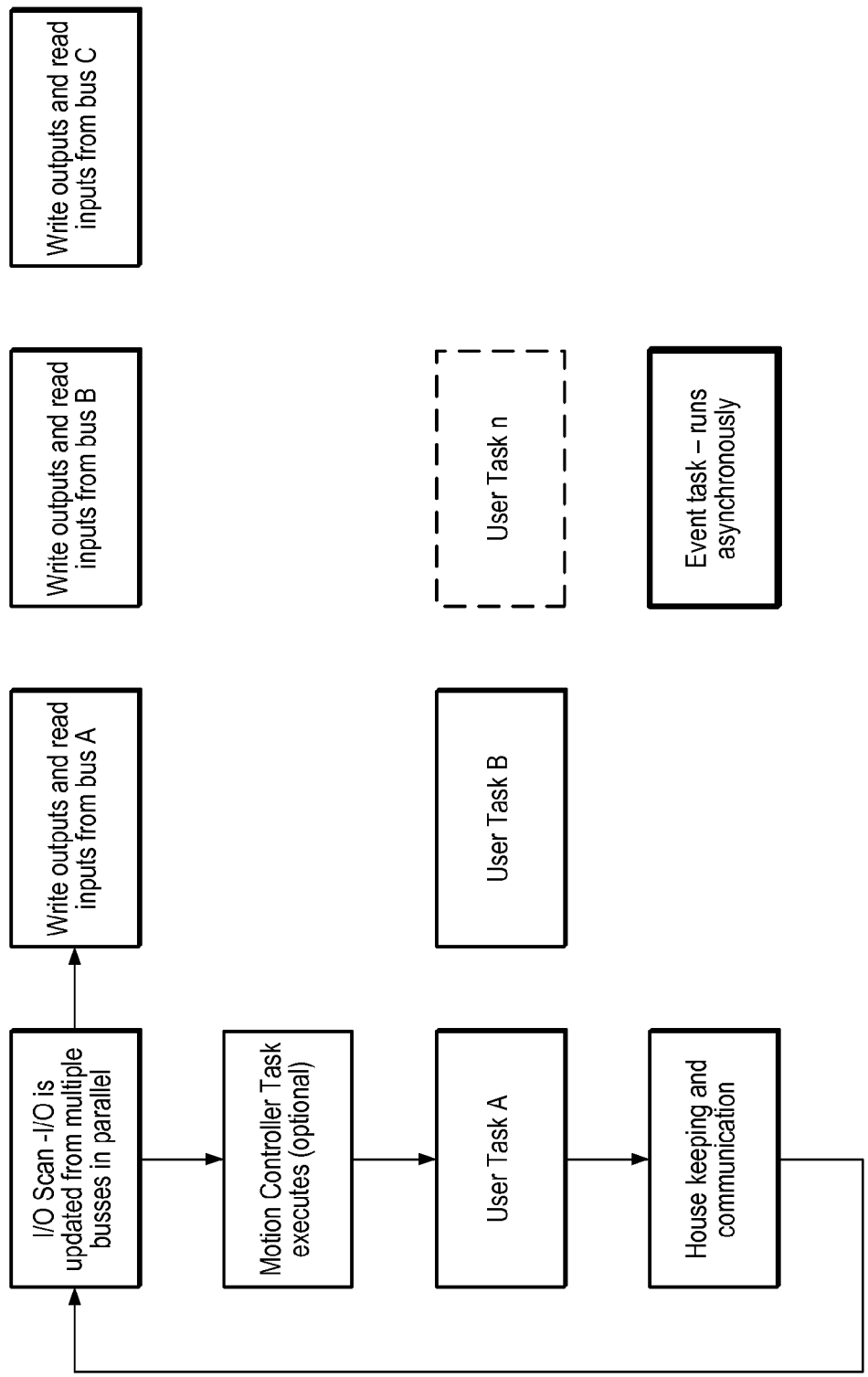
FIG. 4A is a flowchart diagram illustrating one embodiment of operation of a programmable logic controller with multiple processors, according to one embodiment.
Figure 4B:
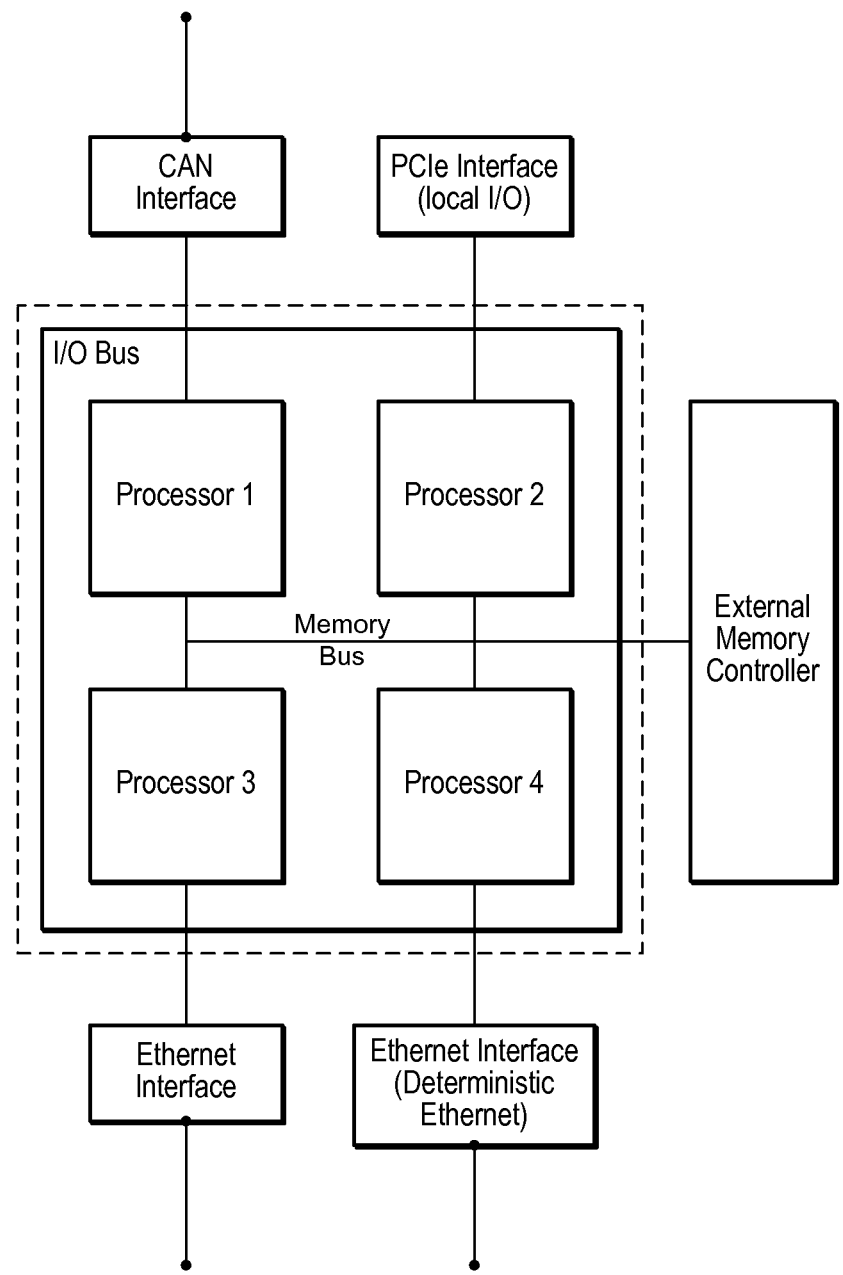
FIG. 4B is a block diagram of an exemplary programmable controller with multiple processors, according to one embodiment.

FIGS. 4A and 4B—Exemplary Programmable Controller with Multiple Processors

FIG. 4A illustrates an exemplary flowchart of operation of a programmable controller with multiple processors, and FIG. 4B illustrates an exemplary block diagram of a programmable controller with multiple processors.

As shown in FIG. 4B processors 1, 2, 3, and 4 may each communicate to memory using an external memory controller, and four different interfaces (e.g., via an I/O bus): a CAN interface (e.g., for slave I/O or devices using CAN or other variants), a PCIe Interface (for local I/O, such as devices or cards plugged in to a backplane of or coupled to the programmable controller), a deterministic Ethernet interface (e.g., EtherCAT or other interfaces for slave I/O or devices), and/or a standard Ethernet interface (e.g., for HMI and/or operator communication), among other possible interfaces. Note that this depiction is exemplary only and that each processor (or any subset of the processors) may each have associated I/O busses and/or memory controllers. Each processor may be operable to access any of the interfaces (e.g., concurrent to other processors accessing respective interfaces) and access memory via the memory controller.

As shown in the exemplary flowchart of FIG. 4A, the programmable controller may operate according to the scanning architecture described above in FIG. 3. More specifically, at a first point in the execution/operation of the programmable controller, an I/O scan may be performed, possibly across multiple busses in parallel. Following the example of FIG. 4B, the programmable controller may include four processors and three device I/O busses (in this case, the CAN interface, PCIe interface, and deterministic Ethernet interface). Thus, during the I/O scan, outputs may be written to and inputs may be read from three different interfaces (also referred to as busses). One of the processors may be reserved for asynchronous events/tasks.

In one embodiment, each of three processors of the multiple processors may be used to read inputs and write outputs for each particular interface, e.g., in a concurrent fashion. In other words, a processor 1 may write outputs to and read inputs from the CAN interface, processor 2 may write outputs to and read inputs from the deterministic Ethernet interface, and processor 3 may write outputs to and read inputs from the PCIe interface. As indicated above, these operations may be scheduled/operated in a concurrent fashion where the three processors read inputs and write outputs during overlapping time periods. However, in one embodiment, the processors may not operate in a concurrent fashion or the processors may be distributed across the various busses in any desired combination. In one embodiment, a processor may not necessarily be assigned to each interface; for example, two processors may be used for deterministic Ethernet and a third may be used for PCIe and CAN or all three processors may be used for each bus in turn or concurrently, as desired. Thus, a variety of assignments of processors may be used across multiple busses of the programmable controller.

After the I/O scan, a motion controller task may execute, if desired and/or if present. Next, the user tasks may be executed in a parallel/concurrent fashion. As shown, user task A, B, . . . , n may execute using the various processors. In one embodiment, the user tasks may be assigned to a respective processor up to the number of processors used (or not reserved) for user tasks/general operation. In one embodiment, one or more other processors of the programmable controller may be reserved for asynchronous tasks/events. As indicated above, the user programs may have associated priorities. In one embodiment, user programs may only execute concurrently if they have the same priority and/or do not include any overlapping data dependencies (in order to ensure deterministic operation). Thus, as one example, if the user programs on the programmable controller have priorities 1, 1, 1, 2, 2, 3, 4, 4; the first three may execute concurrently across three processors during a first time period, the programs with priority 2 may execute concurrently during a second time period, the program with priority with priority 3 may execute during a third time period, and the programs with priority 4 may execute concurrently during a fourth time period.

When not all processors are utilized (e.g., in the second, third, and fourth time periods if the programmable controller includes three or more processors), more than one processor may be used for a task. However, as indicated above, one of the processors may be used for asynchronous events. Where there are more user programs with the same priority than the allocated/available number of processors, the scheduler may spread execution of the tasks across the available number of processors in the first time period, or delay left over tasks (the number exceeding the number of processors available) to a second time period. For example, where there are three available processors and user programs with the following priorities (1, 1, 1, 1, 1, 2, 2), the first three user programs may execute during a first time period (e.g., each assigned to a respective processor), the remaining two user programs with priority 1 may be executed during a second time period (e.g., using two or three of the processors), and the two user programs with priority 2 may be executed during a third time period (e.g., using two or three of the available processors).

Finally, house keeping and communication tasks may be performed (e.g., using the Ethernet interface shown in FIG. 4B. This may include clean up memory, communication with an HMI to receive input, providing data to the HMI, and/or other background tasks that may be defined by the user. For example, these tasks may be for data logging or monitoring non-critical inputs.

As noted above, one or more processors of the programmable controller may be reserved to execute event task(s) (depending on the nature of the control task). These processors may be kept available when an asynchronous event is received in order to execute corresponding event tasks (which are programmed to execute when the event occurs). Events may include receiving data on a particular input channel, from a device, when certain data is received, and/or other types of asynchronous events (such as, for example, arrival of a network frame asynchronously). By reserving these one or more processors, the motion controller task, user tasks, house keeping and communication, and I/O scan may not have an jitter (i.e., delays in execution of tasks/processors in the scanning architecture) resulting from execution of the event task (as is usually the case for prior art programmable controllers). In other words, typical older systems would have delays in execution when an event task was executed; using the dedicated one or more processors for event tasks as described herein, this is not the case.

Thus, FIG. 4 illustrates an exemplary flowchart of operation of a programmable controller with a plurality of processors, according to embodiments herein.

Figure 5:
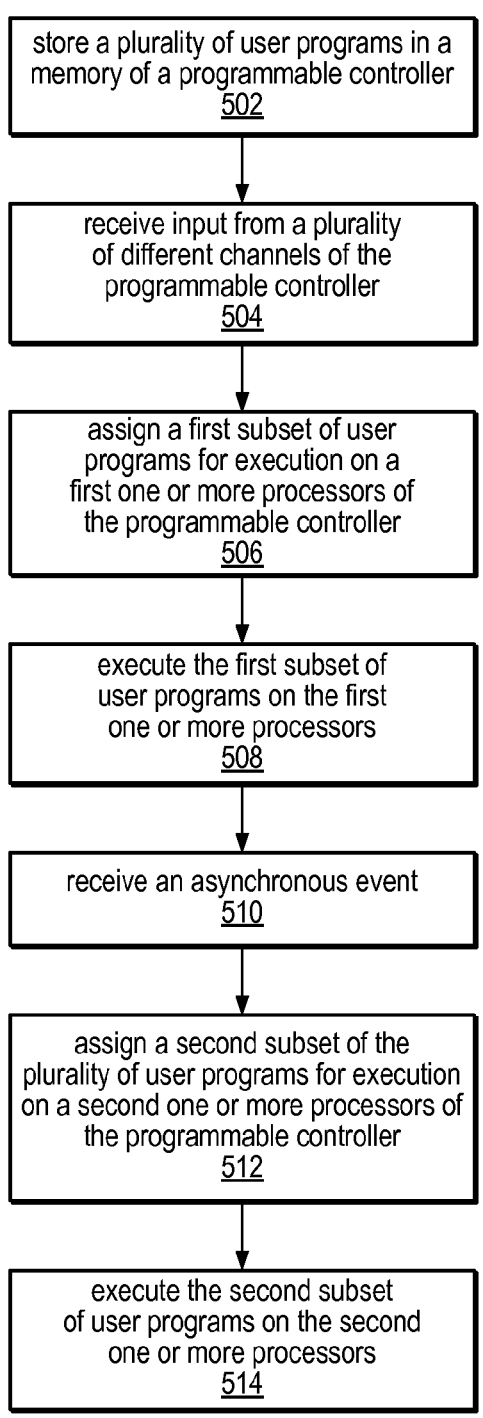
FIG. 5 is a flowchart diagram illustrating an exemplary method for operating a programmable logic controller with multiple processors, according to one embodiment.

FIG. 5—Method for Operating a Programmable Controller with Multiple Processors FIG. 5 illustrates an exemplary method for operating a programmable controller with multiple processors, according to some embodiments. The method shown in FIG. 5 may be used in conjunction with any of the systems or devices described above. In various embodiments, some of the method elements shown may be performed concurrently, in a different order than shown, or may be omitted. Additional method elements may also be performed as desired. As shown, the method may operate as follows.

In 502, a plurality of user programs may be stored on a memory of the programmable controller. In some embodiments, the user programs may be stored on the memory of the programmable controller using a configuration program of the programmable controller (i.e., one that allows for downloading of user programs to the programmable controller). Additionally, as indicated above, the user programs may have associated execution priorities, e.g., as assigned by a user.

In one embodiment, the configuration program may be a graphical programming development environment program. In such embodiments, the user may have created the user programs by assembling graphical programs (e.g., using methods described in references incorporated by reference above) by a plurality connecting icons/nodes on a display, wherein the plurality of interconnected nodes represent functionality of the user programs. The graphical program(s) (e.g., data flow graphical programs, state charts, etc.) may fully specify the user programs, the control programs, the control engine, and/or other elements of the programmable controller. In one embodiment, the user may specify user programs and control tasks, and the editing environment may automatically provide a controller engine/scheduler to download to (or configure) the programmable controller. Correspondingly, after providing these user programs (graphical or otherwise) and/or the controller engine the programmable controller may be configured to execute the user programs according to the scanning architecture and embodiments described herein.

In 504, input may be received from a plurality of different channels of the programmable controller, e.g., according to a scanning architecture. As described above, the programmable controller may execute according to a scanning architecture (e.g., as specified by a scheduler or controller engine). During each cycle of the scanning architecture, the programmable controller may perform an I/O scan of channels of the programmable controller. The channels of the programmable controller may coupled to the I/O scanning engine (i.e., the processor(s) executing the I/O scanning engine) via one or more busses. In one embodiment, as indicated above, various one(s) of the processors may be used to scan a plurality of busses or a single bus. Each bus may be coupled to a subset, a respective subset (i.e., dedicated to that bus), or all of the input/output channels (which may be used to communicate with various devices coupled to the programmable controller) of the programmable controller. In one embodiment, only the plurality of processors assigned for periodic program execution (i.e., not the processor(s) assigned for asynchronous event programs) may be used for I/O scanning. However, in alternate embodiments, any portion or all of the processors may be used for I/O scanning.

In 506, a first subset of user programs may be assigned for execution on a first one or more processors of the programmable controller. As indicated above, the plurality of processors of the programmable controller may be divided into subsets, e.g., the first one or more processors for execution of periodic tasks (according to the scanning architecture) and another subset of the processors may be used for execution of asynchronous tasks (e.g., when an asynchronous event occurs). In some embodiments, all but one of the processors may be used for the periodic tasks and a single processor may be used for the asynchronous event. However, any subdivision/assignment of the processors are envisioned.

The first subset of user programs may be assigned for execution according to the priorities and/or data dependencies of the user programs. For example, as indicated above, user programs with similar or the same execution priorities may be scheduled to execute concurrently (i.e., during overlapping time periods) on different processors of the first one or more processors. However, the first subset of user programs may be analyzed for data dependencies and then assigned to the different processors according to a schedule (e.g., by the scheduler). Thus, the user programs may be assigned for execution across various processors of the first one or more processors in an order/manner to ensure deterministic operation (e.g., based on data dependencies) and/or according to user program execution priorities (e.g., as assigned by the user). Note that in some embodiments, the execution priorities may be assigned automatically, e.g., during analysis and/or creation of the user programs.

In 508, the first subset of user programs may be executed by the first one or more processors. The programmable logic controller may execute the first subset of user programs using the first one or more processors according to the assignment/schedule of 506. As indicated above, the first subset of user programs may be executed during the program scan of the scanning architecture. These programs may use input stored in a memory map which may have been updated in the previous I/O scan. Additionally, the programs may provide output to the memory map which may be provided to channels (e.g., output channels) of the programmable controller to coupled devices.

In 510, an asynchronous event may be received. As indicated above, the asynchronous event may any type of asynchronous event. For example, the asynchronous event may be data received on a specific channel or bus of the programmable controller, a certain sequence of data, a certain data point on a channel or bus, a particular combination of data resulting from user program execution, and/or any type of asynchronous event.

In 512, a second subset of the plurality of user programs may be assigned for execution on a second one or more processors of the programmable controller. 512 may be performed before or after 510. For example, the second subset of the plurality of user programs may be assigned for execution on the second one or more processors during initialization of the programmable controller or at any point up to and including the receipt of the asynchronous event. As indicated above, the second one or more processors of the programmable controller may be reserved for asynchronous events/task execution (e.g., not used for normal periodic execution of programs, I/O scans, etc., of the scanning architecture described above). However, it should be noted that the second one or more processors and the second subset of the plurality of programs may still be subject to the scanning architecture of the programmable controller. More specifically, data used by the event programs is still updated according to the schedule of the scanning architecture. In other words, the event programs may still use the data loaded from the channels in the last I/O scan. Thus, the second subset of user programs (e.g., the event based user programs) may be assigned for execution on the second one or more processors of the programmable controller.

In 514, the second subset of the plurality of user programs may be executed by the second one or more processors. As indicated above, because the second user programs are executed on separate processor(s) than the first user programs, the event based tasks may not introduce a delay in execution of the first programs (which may typically provide periodic control functionality), thus decreasing the impact of an asynchronous event/task occurring during operation of the task(s) (e.g., a control task) of the programmable logic controller.

However, it should be noted that in some embodiments, no asynchronous events or programs may be scheduled (e.g., if the user has not created any programs for asynchronous events or introduced the possibility of asynchronous events). In these embodiments, all of the processors may be used according to 502-508. In other words, processors may not necessarily be reserved for asynchronous event programs where there are no such programs for assignment.

Thus, FIG. 5 illustrates one exemplary embodiment of a method for operating or controlling a programmable controller with multiple processors.

Figure 6:
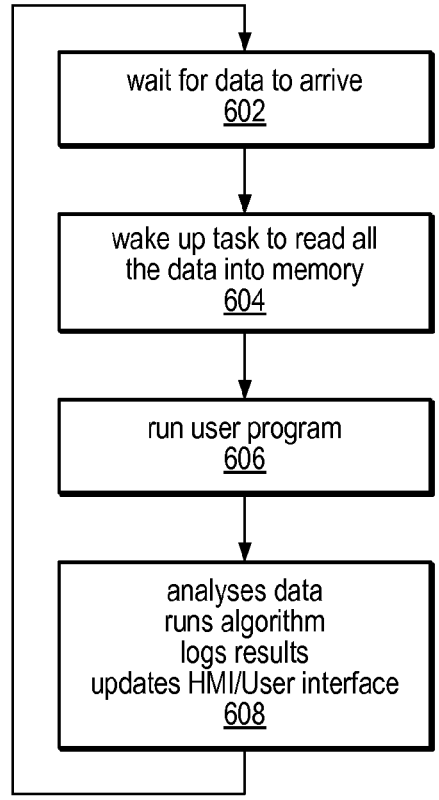
FIG. 6 is a flowchart diagram illustrating an exemplary measurement/acquisition architecture, according to one embodiment.

FIG. 6—Exemplary Data Acquisition Architecture

FIG. 6 illustrates an exemplary flowchart diagram illustrating one embodiment of a data acquisition architecture. As shown, this architecture performs tasks in response to the reception of data. More specifically, the data acquisition scheduler (or measurement engine) waits for data to arrive (602), and upon reception of data, wakes up a task to read all data into memory (604). User program(s) may be run in response to the reception of data (606). After execution of the user programs based on the data, one or more analyses or algorithms may be executed, the results may be logged (e.g., of the analyses, algorithms, user programs, etc.) and the HMI/user interface may be updated (608). This cycle may be performed repeatedly, upon arrival of data, as indicated by the flowchart.

The data acquisition architecture (or measurement architecture) may be substantially different from the scanning architecture described above (e.g., as used in control tasks). More specifically, while control tasks using a scanning architecture are more concerned with the latest data (and the immediacy of that data) and may not require data history (or can handle loss of some data points), measurement architectures may be used where avoiding data loss is important. Some measurement tasks may not require timely execution or low jitter, but some automation tasks may require responses within, for example, a few milliseconds. Additionally, measurement architectures typically do not operate in periodic execution cycles as scanning architectures do, but may only wake up and execute when certain types of data has arrived. Similar to descriptions above regarding asynchronous events, measurement programs may be executed according to various conditions, depending on the data received. For example, one measurement program may execute when data from a certain coupled device is received and another may execute when a certain type of data is received (e.g., when a particular value or a particular header is received, or when data is received on a particular channel, among others).

Using typical single processor programmable controllers, it would be impossible to maintain both the scanning architecture and data acquisition architecture without negatively affecting execution of the respective architectures. For example, if a measurement task was scheduled to run on the same CPU as a control task, it would be impossible to not pre-empt the control task when data arrives, so that the measurement task can complete its execution. This would cause jitter on the control task and potentially cause it to run late. On the other hand if the measurement task was delayed so that the control task gets to finish its execution, it may not be able to respond to the arrival of data, causing potentially data buffer overflow and data loss.

Figure 7:
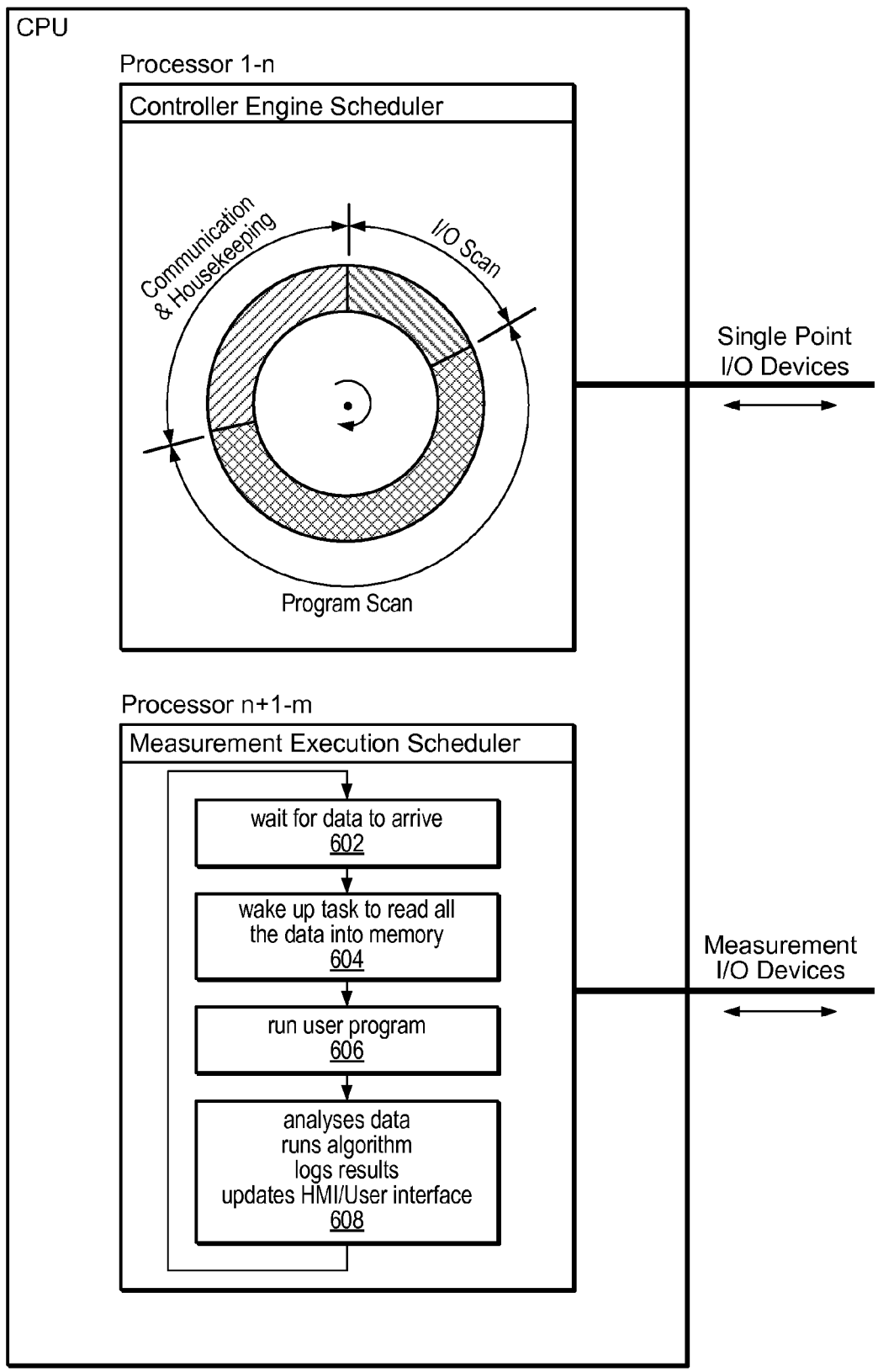
FIG. 7 is a block diagram illustrating a programmable controller which operates according to a scanning architecture and a measurement/acquisition architecture, according to one embodiment.

FIG. 7 illustrates a block diagram of a programmable controller with multiple processors and architectures. As shown, a first set of processors (1–n) may be assigned for execution according to the scanning architecture of the controller engine scheduler and a second set of processors ((n+1)–m) may be assigned for execution according to the data acquisition architecture of the measurement execution scheduler.

Each scheduler may have associated busses or interfaces, e.g., as shown, where the controller engine scheduler communicates over one or more busses to communicate with single point I/O devices while the measurement execution scheduler communicates over one or busses to communicate with measurement I/O devices. However, it should be noted that the two schedulers (or the processors of assigned for the two schedulers) may be able to share busses capable of sharing between the engines (e.g., PCIe). In these cases, assignment of I/O may be performed on a device level rather than a bus level. Sharing may not be possible with network which have a bus cycle associated with them. For example, if two CAN networks are available, each scheduler can be assigned one, but they cannot share devices on the same CAN bus. Note that the assignment of the processors to the different schedulers may be static or dynamic (e.g., according to the requirements of the two schedulers at any given time, or predicted time), as desired.

Figure 8:
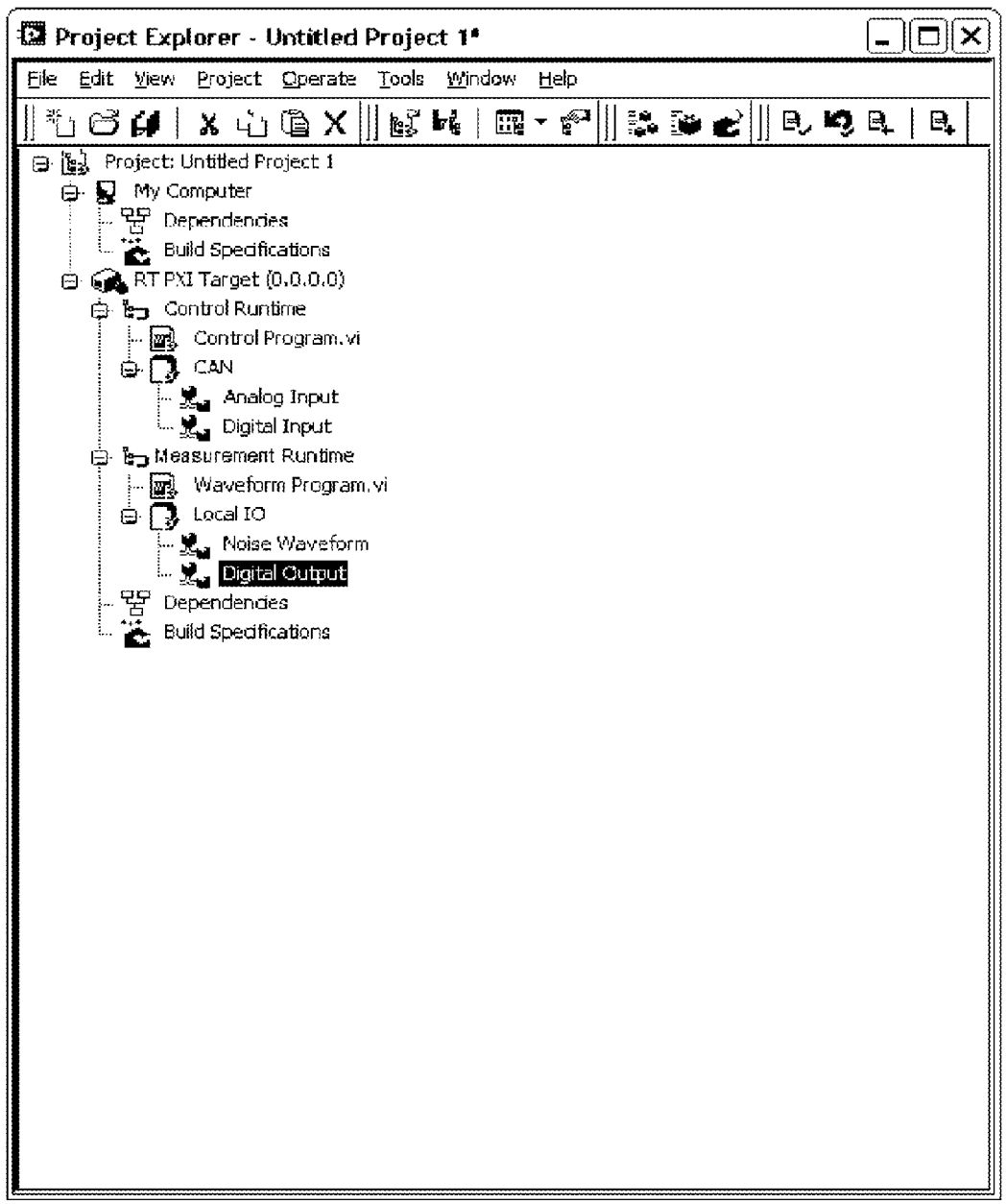
FIG. 8 illustrates an exemplary screen shot of a programmable controller configuration program, according to one embodiment.

Additionally, while both of these schedulers may execute on the same programmable logic controller, they may run independently (as indicated above), and may be independently controllable. For example, FIG. 8 shows an exemplary configuration program (in this case, a graphical programming environment project explorer (LabVIEW®) provided by National Instruments Inc.) where the control runtime and the measurement runtime are independently configurable while they execute on the same programmable controller. As shown, the two runtimes have associated graphical programs (control program.vi and waveform program.vi) which include the user programs for the different schedulers.

Figure 9:
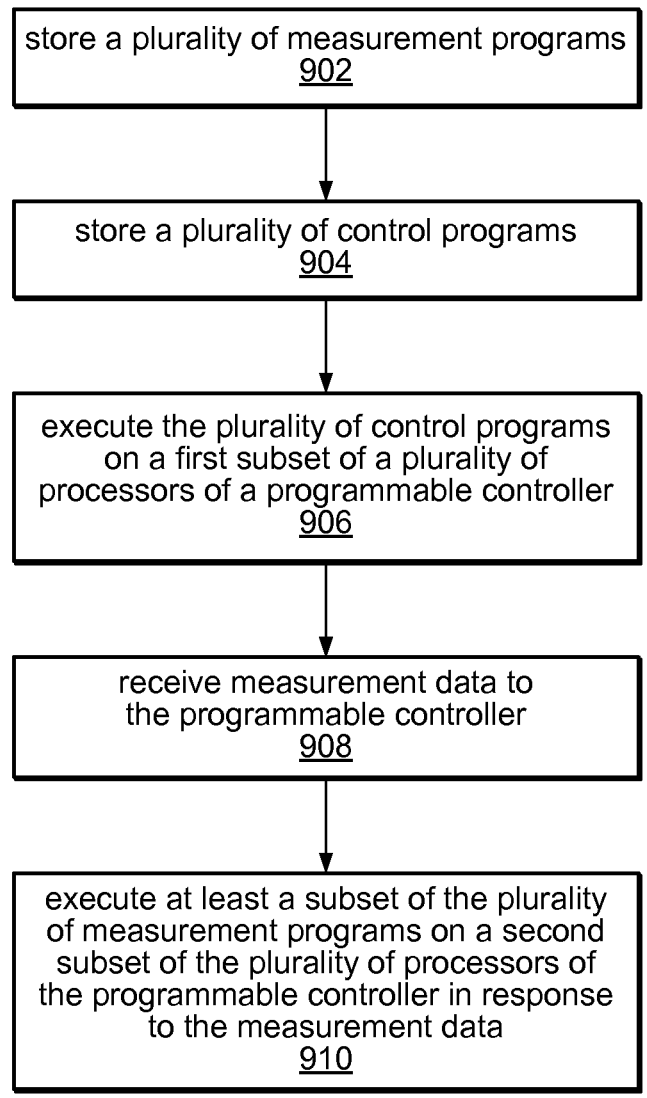
FIG. 9 is a flowchart diagram illustrating an exemplary method for operating a programmable controller with multiple processors according to a scanning architecture and a measurement/acquisition architecture, according to one embodiment.

FIG. 9—Method for Operating a Programmable Controller with Multiple Architectures FIG. 9 illustrates an exemplary method for operating a programmable controller with multiple processors according to multiple architectures. More specifically, FIG. 9 illustrates an exemplary method for operating a programmable controller according to a scanning architecture and a data acquisition architecture, according to some embodiments. The method shown in FIG. 9 may be used in conjunction with any of the systems or devices described above. In various embodiments, some of the method elements shown may be performed concurrently, in a different order than shown, or may be omitted. Additional method elements may also be performed as desired. As shown, the method may operate as follows.

In 902, a plurality of measurement programs may be stored on a memory of the programmable controller. Similar to embodiments described above, the measurement programs may be created in a graphical programming development environment by assembling a plurality of interconnected icons. Additionally, the programs (graphical or otherwise) may be stored in a memory of the programmable controller by a configuration program (possibly the graphical programming development environment) by deploying the runtime engine or scheduler and/or the measurement programs onto the programmable controller. As shown in FIG. 8, the measurement programs may be deployed to a measurement/data acquisition runtime in a graphical user interface, and then deployed to the programmable controller.

In 904, a plurality of control programs may be stored on a memory of the programmable controller. Similar to 902, the user may store the plurality of control programs on the programmable controller, e.g., as controlled under a controller run time engine or scheduler.

In 906, the plurality of control programs may be executed on a first subset of a plurality of processors of a programmable controller according to a scanning architecture. The first subset of the plurality of processors may be assigned statically (e.g., using a development environment or configuration program, such as the one showed in FIG. 8) or may be assigned dynamically depending on the number of programs and available resources. The plurality of control programs may execute on the first subset of the plurality of processors similar to the fashion described above with respect to FIG. 5.

In 908, measurement data may be received by the programmable controller. Measurement data may be received through various channels or interfaces, such as those described above among others. In various embodiments, the measurement data may be received from various devices coupled to and/or controlled by the programmable controller. In response to the reception of data, the data acquisition architecture may be used by the measurement runtime engine executing on a second subset of the processors of the programmable controller.

Correspondingly, in 910, at least a subset of the plurality of measurement programs may be executed on the second subset of the plurality of processors of the programmable controller in response to the measurement data. The subset of the measurement programs may be executed based on the triggers of the measurement programs. In other words, the subset of the plurality of measurement programs may be assigned for execution whenever any data comes in, whenever particular data comes in, whenever data is received on a particular channel or from a particular device, whenever the data is of a certain form, and/or other conditions. Thus, all of the measurement programs may not execute where some of the programs do not need to execute, depending on the measurement data received. Thus, all or a subset of the plurality of measurement programs may be executed by the second subset of the plurality of processors.

Thus, FIG. 9 describes an exemplary method for operating a programmable controller with multiple processors according to different architectures. Note that while embodiments described above relate to a programmable controller executing two different architectures, it may be possible to apply these concepts to computer systems. For example, a computer system may execute the scanning architecture for control in a real time operating system while executing the data acquisition architecture for measurement in a non-real time/deterministic environment. Additionally, it should be noted that other architectures (and numbers of concurrently executing architectures) are envisioned.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A programmable controller, comprising:
    a plurality of channels for receiving input;
    a plurality of processors, the plurality of processors comprising a first one or more processors and a second one or more processors;
    at least one memory medium coupled to the plurality of processors and the plurality of channels, wherein the memory medium stores:
        an I/O scanning engine that is executable by at least one of the first one or more processors, wherein the I/O scanning engine is executable to receive input from the plurality of channels of the programmable controller according to a scanning architecture;
        a plurality of user programs, wherein the plurality of user programs are each executable to perform a function based on input received from the plurality of channels;
        a scheduler program that is executable by at least one of the processors, wherein the scheduler program is executable to allocate each of the plurality of user programs to respective one or more of the plurality of processors, wherein the scheduler program is executable to schedule each of at least two user programs to execute on a respective one or more processors concurrently;
    wherein the scheduler program is executable to dynamically schedule a first subset of the plurality of user programs to execute on the first one or more processors according to the scanning architecture, wherein the scanning architecture specifies that execution of the first subset of the plurality of user programs is time-driven according to a periodic execution cycle, not in response to asynchronous events; and
    wherein the scheduler program is executable to dynamically schedule a second subset of the plurality of user programs to execute on the second one or more processors in response to asynchronous events, not according to a periodic execution cycle, and wherein execution of the second subset of the plurality of user programs on the second one or more processors does not introduce a delay in execution of the first subset of the plurality of user programs executing on the first one or more processors.

2. The programmable controller of claim 1, wherein the scheduler program is executable to assign portions of the I/O scanning engine to execute concurrently on at least two of the plurality of processors.

3. The programmable controller of claim 2, wherein each portion of the I/O scanning engine is configured to scan a respective bus of the programmable controller.

4. The programmable controller of claim 1, wherein the programmable controller is configured to control operation of a plurality of devices coupled to the programmable controller, wherein the first subset of the plurality of user programs are executable to receive input from the plurality of devices, and wherein the programmable controller is configured to receive the asynchronous events from one or more of the plurality of devices.

5. The programmable controller of claim 1, wherein the scheduler program is executable to:
    dynamically assign processors of the plurality of processors to the first one or more processors; and
    dynamically assign processors of the plurality of processors to the second one or more processors.

6. The programmable controller of claim 5, wherein said dynamically assigning processors of the plurality of processors to the first one or more processors and said dynamically assigning processors of the plurality of processors to the second one or more processors are performed based on one or more of:
    a number of user programs in the first subset of user programs;
    a number of user programs in the second subset of user programs; or
    a number of available processors.

7. A method for operating a programmable controller, wherein the programmable controller comprises a plurality of processors, the plurality of processors comprising a first plurality of processors and a second one or more processors, the method comprising:
    storing a plurality of user programs on the programmable controller, wherein the plurality of user programs are each executable to perform a function;
    receiving input from a plurality of different channels of the programmable controller according to a scanning architecture;
    dynamically assigning execution of each of a first subset of the user programs to a respective one or more processors of the first plurality of processors according to the scanning architecture, wherein the scanning architecture specifies that execution of each of the first subset of the user programs is time-driven according to a periodic execution cycle, not in response to asynchronous events;
    executing each of the first subset of the user programs on the respective one or more processors of the first plurality of processors according to the scanning architecture, wherein the first subset of the user programs perform functions based on the input from the plurality of different channels;

receiving an asynchronous event;

assigning a second subset of the plurality of user programs to execute on the second one or more processors in response to the asynchronous event, not according to a periodic execution cycle;

executing the second subset of the plurality of user programs on the second one or more processors in response to the asynchronous event, wherein said executing the second subset of the plurality of user programs on the second one or more processors does not introduce a delay in said executing the first subset of the plurality of user programs on the first plurality of processors.

8. The method of claim 7, wherein said executing the first subset of the user programs and said executing the second subset of the plurality of user programs is performed concurrently.

9. The method of claim 7, wherein said executing the first subset of the user programs comprises executing at least two user programs of the first subset of the user programs concurrently.

10. The method of claim 7, wherein said assigning execution of the first subset of user programs and said assigning execution of the second subset of user programs is performed by executing a scheduler program on at least one of the plurality of processors.

11. The method of claim 7, further comprising:

providing output to the plurality of different channels of the programmable controller according to the scanning architecture.

12. The method of claim 7, wherein said receiving input from a plurality of different channels of the programmable is performed using a subset of the plurality of processors, wherein each processor is used for a respective bus of the programmable controller.

* * * * *